(No Model.)

S. W. BARCLAY & C. W. SHIVELY.
SOIL PULVERIZER.

No. 500,109. Patented June 27, 1893.

Witnesses:
Ray Hutchins.
Herbert Cowell.

Inventors:
Squire W. Barclay
Charles W. Shively, By
Thos H Hutchins his
Attorney.

UNITED STATES PATENT OFFICE.

SQUIRE W. BARCLAY AND CHARLES W. SHIVELY, OF JOLIET, ASSIGNORS TO WILLIAM F. BARCLAY, OF COVEL, ILLINOIS.

SOIL-PULVERIZER.

SPECIFICATION forming part of Letters Patent No. 500,109, dated June 27, 1893.

Application filed April 12, 1893. Serial No. 470,026. (No model.)

*To all whom it may concern:*

Be it known that we, SQUIRE W. BARCLAY and CHARLES W. SHIVELY, citizens of the United States of America, residing at Joliet, in the county of Will and State of Illinois, have invented certain new and useful Improvements in Soil-Pulverizers, of which the following is a specification, reference being had therein to the accompanying drawings and the letters of reference thereon, forming a part of this specification, in which—

Figure 1:
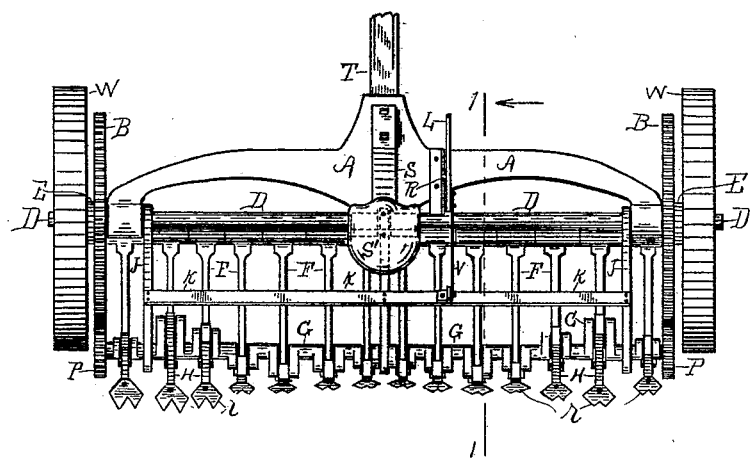
Figure 2:
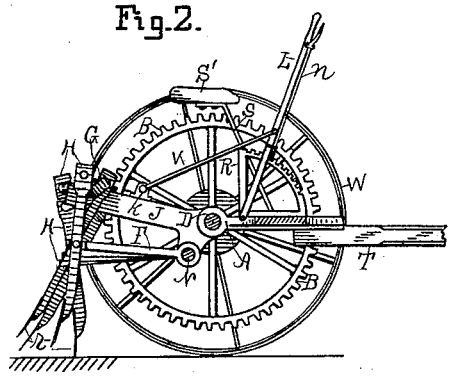
Figure 3:
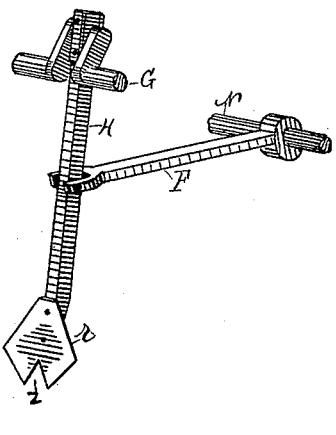
Figure 4:
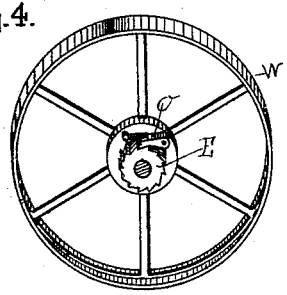
Figure 5:

Figure 1 is a plan view of the soil pulverizer. Fig. 2, is a vertical section of the pulverizer taken on line 1 of Fig. 1 looking in the direction of the arrow. Fig. 3 is a perspective view of one of the shovel beams, and its brace, and of a section of the crank shaft of the shovel beams. Fig. 4, is a perspective view of one of the traveling wheels of the pulverizer, showing a pawl on its hub and Fig. 5 is a perspective view of a section of the crank shaft of the shovel beams.

This invention relates to certain improvements in soil pulverizers, which improvements are fully set forth and explained in the following specification and claims.

Referring to the drawings A represents the main frame of the machine journaled at each end on the axle D near its outer ends, but between the drive gears. Said axle has secured on it the two drive gears B, and also two ratchet wheels E, the ratchet wheels being located respectively next to said drive gears at their outer sides. Said axle has also boxed on each end a traveling wheel W, each of which traveling wheels is provided with a pawl O as shown in Fig. 4 for engaging the teeth of the ratchet wheels E to drive the drive gears B when the machine is traveling forward.

J, J, are a pair of arms having their inner ends journaled on axle D, and located, one toward either end of the axle between the drive gears B.

G is a crank shaft having its ends journaled respectively in the outer ends of said arms J, and K is a cross bar for connecting said arms J about centrally between their ends. Said crank shaft has secured to each extreme outer end the pinions P which are in mesh with and driven by the drive gears B. Said crank shaft G is formed so as to consist of a continuous series of cranks arranged at different angles from each other, and to each crank is pivotally connected a shovel beam H, having a shovel r on its lower end as shown in Figs. 1 and 3 particularly. Each shovel beam H is held in its proper vertical position by means of a brace F having its outer end pivotally connected to the shovel beam at about its center, and having its rear end boxed on a shaft N having its ends secured respectively to the arms J as shown in Fig. 2. Said crank shaft G may have any desired number of cranks throughout its length, and set at any desired angle with relation to each other, and it is intended that said cranks shall be set at different angles from each other so as to prevent all the shovels from entering the ground at once, as if they separately engage the ground they can be made the more easily to enter the ground. Shovels r are secured to the lower ends of the shovel beams as shown particularly in Fig. 3, and the shovels are double pointed, or serrated on their points as shown at Z for the purpose of enabling them to be the more readily forced into the ground.

A spring standard S is attached to the upper side of frame A, for supporting a seat S'.

L is a hand lever having its lower end pivotally connected to the machine frame A, and is connected by means of a link V with cross bar K, attached to arms J, for the purpose of providing means for elevating and lowering the shovel beams and shovels. Said lever is provided with a hand latch N for engaging the notched segment R for holding said shovel beams and shovels properly adjusted.

In operation as the machine travels forward, and a rotary motion is imparted to the crank shaft G through the medium of the gears B and pinions P, the shovels are caused to respectively enter the ground like a spade, and throw the ground rearward and thus thoroughly dig it up and pulverize it.

Having thus described our invention, what we claim as new, and desire to secure by Letters Patent, is as follows, to wit:

1. The soil pulverizer comprising the combination of the axle D having the ratchet wheels E, and drive gears B secured thereto and having the traveling wheels W provided with pawls o, journaled respectively on the outer ends of said axle, the main frame A journaled on said axle, and having the tongue T and seat S S', arms J J having their inner ends journaled on said axle, cross bar K for connecting said arms, crank shaft G journaled in the outer ends of said arms J, and having pinions P secured, one on each outer end, shovel beams H having shovels r, and carried by the cranks of said crank shaft, shaft N having its ends respectively secured to arms J, braces F for pivotally connecting said shovel beams and shaft N, latch lever L, link V and notched segment r all arranged to operate substantially as and for the purpose set forth.

2. In a soil pulverizer, the combination of axle D having drive gears B secured thereon, arms J journaled at their inner ends on said axle, cross bar K for connecting said arms, crank shaft G journaled in the outer ends of arms J and having the pinions P secured, one on each outer end, shovel beams H and shovels r respectively carried by said cranks of said crank shaft, shaft N having its ends respectively secured in arms J, braces F for pivotally connecting said shovel beams and shaft N, and the means for driving said gears and shovels, and for vertically adjusting said shovels and their beams substantially as and for the purpose set forth.

3. In a soil pulverizer the combination of a crank shaft forming a series of contiguous cranks throughout its length all set at a different angle from each other, shovel beams carried by said cranks, braces pivotally connected to said shovel beams, and the means for driving said cranks and their shovel beams and shovels, all arranged to operate substantially as and for the purpose set forth.

SQUIRE W. BARCLAY.
CHARLES W. SHIVELY.

Witnesses:
THOS. H. HUTCHINS,
RAY HUTCHINS.